Jan. 22, 1963  J. L. CARSWELL ET AL  3,074,870
METHOD AND APPARATUS FOR ELECTRICALLY SEPARATING THE
PHASES OF A WATER-IN-OIL EMULSION
Filed March 31, 1959  2 Sheets-Sheet 1

INVENTORS:
JOHN L. CARSWELL
JAMES HALL CARPENTER
BY Howson & Howson
ATTYS.

INVENTORS:
JOHN L. CARSWELL
JAMES HALL CARPENTER
BY
Howson & Howson
ATTYS.

United States Patent Office 3,074,870
Patented Jan. 22, 1963

---

3,074,870
METHOD AND APPARATUS FOR ELECTRICALLY SEPARATING THE PHASES OF A WATER-IN-OIL EMULSION
John L. Carswell and James Hall Carpenter, Jacksonville, Fla., assignors, by mesne assignments, to Carpco-Kewanee, Inc., Jacksonville, Fla., a corporation of Delaware
Filed Mar. 31, 1959, Ser. No. 803,287
13 Claims. (Cl. 204—188)

The present invention relates to a novel apparatus for treating liquids with a corona wind discharge, especially for separating the phases of a water-in-oil emulsion. More particularly the invention relates to novel apparatus utilizing a corona wind discharge for the separation of a water-in-oil emulsion into its component parts. The invention also relates to a novel method for treating liquids with a corona wind discharge, especially for separating the phases of a water-in-oil emulsion. The present application is a continuation-in-part of application Serial Number 729,718, filed April 21, 1958, and now abandoned.

The resolution of water-in-oil emulsions into their separate oil and water phases has been the subject of much investigation over the years. The problem is encountered in a wide variety of oil-water emulsion systems involving various types of oils and emulsions obtained from various sources, and is particularly acute in the petroleum field where petroleum oil-water emulsions are common either as regards the form of water-in-oil emulsion in which petroleum is often obtained from the well or as regards water-in-oil emulsions produced as the result of various petroleum-treating operations.

Many means have been suggested for resolving the phases of an oil-water emulsion, and among these are electrical devices wherein the emulsion is passed in contact with electrodes to cause coalescence or agglomeration of the water particles into relatively large masses which will gravitate from the oil upon settling or which are forced electrically into a separate layer. In such procedures one or a plurality of discharge electrodes connected to a high voltage source is immersed in the body of oil-water emulsion, there also being provided in contact with emulsion one or more other electrodes charged oppositely to that of the discharge electrode or electrodes. Such procedures possess limitations and disadvantages which hinder the full utilization thereof and which prevent substantially complete separation of the two phases. Thus, as is well known, the water particles of the emulsion have a tendency to line up during the passage of the emulsion through the field and thus to form paths of relatively low resistance which tend to short-circuit the electrodes. With very high voltage, the agitation and turbulence produced adjacent the submerged discharge electrodes tends to produce re-emulsification and limits the amount of voltage that can be employed. These short-circuiting and re-emulsification phenomena limit the distance between the electrodes that can be employed so that the discharge electrodes cannot be relatively closely spaced to the oppositely-charged electrodes whereas theoretically the higher the potential gradient between the electrodes the more effective the process. The stated re-emulsification phenomenon also requires that the equipment possess relatively large settling volumes and relatively long holding times to enable the water which does separate to settle out. The above-mentioned limitations become more acute as the proportion of water in the emulsion increases. Speaking generally, therefore, the disadvantages of these procedures lie in their failure efficiently to separate water and to separate substantially all of the water.

Another suggestion has involved the application of a corona wind discharge downwardly onto the surface of a shallow layer of emulsion flowing horizontally across a flat, grounded pan. So far as is known this suggestion has never had any significant commercial success, and, in the light of our research and discoveries, it is apparent that this suggestion is inefficient and impractical.

It is a principal object of the present invention to provide a novel apparatus for treating liquids with a corona wind discharge.

It is another object of the present invention to provide a novel apparatus for separating the phases of an oil-in-water emulsion wherein substantially all of the water in an oil-water emulsion can be separated efficiently.

A further object of the present invention is to provide novel electrical discharge apparatus for separating the phases of an oil-water emulsion wherein no limitation is placed because of short circuiting upon the amount of voltage employed and upon the spacing of the electrodes, and wherein much wider limits of such voltage and electrode spacing are permissible before re-emulsification occurs.

Still another object of the present invention is to provide a novel apparatus for separating the phases of an oil-water emulsion which is much more rapid and efficient than electrical apparatus suggested heretofore.

Another object of the present invention is to provide novel improved apparatus for treating liquids with a corona wind discharge, particularly for separating the phases of an oil-water emulsion and providing the improvements and advantages referred to in the foregoing objects and hereinafter.

These and other objects including the provision of a novel method for treating liquids with a corona wind discharge and for separating the phases of an oil-water emulsion, will become apparent from a consideration of the following specification and the claims.

The novel apparatus of the present invention comprises a vessel for holding a relatively deep body of liquid undergoing treatment, a multiplicity of discharge electrodes adapted, upon being connected to a high voltage source, to effect downwardly-directed corona wind discharges, means beneath said discharge electrodes defining a path for flowing liquid generally upwardly toward the discharge electrodes and terminating below said discharge electrodes to provide a liquid surface spaced below said discharge electrodes, means for admitting liquid to the vessel and to the flow path and means for removing liquid from the vessel, and a screen adapted to be charged oppositely to that of the discharge electrodes, across said flow path and below said termination thereof.

Further features of the invention include the immersion of each unit or assembly as above-defined within the body of liquid undergoing treatment in the vessel, the discharge electrode assembly being provided with means for maintaining a gaseous atmosphere in the space occupied by the discharge electrodes and between them and the surface of the liquid undergoing treatment, such as a hood the sides of which extend downwardly below the stated flow path termination and are spaced outwardly therefrom to provide a gas-liquid seal whereby the space occupied by the discharge electrodes and between them and said liquid surface is filled with gas; and include the provision of a plurality of treating units as defined in the preceding paragraph in at least one common plane within a single vessel. Apparatus of the present invention particularly adapted for the treatment of an oil-water emulsion also includes the provision of a volume of space between the flow path and the means for removing the oil greater than the space within the flow path whereby the oil, after subjection to the corona wind, travels relatively slowly and in a relatively quiescent manner toward the oil take-off means affording opportunity for water remaining therein to settle out before the oil encounters turbulent conditions in the oil recovery system.

The method of the present invention comprises flowing liquid to be treated upwardly through a screen toward downwardly-directed corona wind discharges, and removing the liquid after impingement of the corona wind discharges thereupon laterally away from said corona wind discharges, the screen being charged oppositely to that of the corona wind discharges. Generally, the treatment of a water-in-oil emulsion according to the present method comprises subjecting a relatively deep body of oil-water emulsion to the action of corona wind discharge from a multiplicity of electrically-charged electrodes spaced above said body of oil-water emulsion while said body of oil-water emulsion is flowing generally upwardly through a screen charged oppositely to that of said pointed electrodes and positioned in a horizontal plane below the surface of said body, and separately withdrawing from said body the resultant separated oil and water phases. Provision is also made for flowing the oil from the site of the corona wind discharges to the oil recovery system in a relatively slow, quiescent manner to permit water remaining in the oil to settle out before the oil is subjected to turbulence in the oil-recovery system.

In accordance with the present invention, the discharge electrodes are not immersed or otherwise in contact with the body of oil-water emulsion but are spaced above the surface thereof and the electrical discharge is directed as a corona wind downwardly upon the surface of the oil-water emulsion which is flowing generally upward through a screen toward the corona wind. While, in accordance with the broader aspects of the invention, the process may be carried out under ordinary atmospheric conditions in which case the corona wind impinging upon the surface of the liquid being treated is charged air molecules, in accordance with a preferred embodiment, discussed more in detail hereinafter, the process, particularly as directed to the resolution of petroleum water-in-oil emulsions, is conducted under an atmosphere of substantially oxygen-free gas, such as carbon dioxide, gaseous hydrocarbons like methane (e.g., the natural gas associated with petroleum), nitrogen, helium, argon, and the like, in which case the corona wind discharge impinging upon the surface of the oil-water emulsion is charged molecules of the stated gas.

The invention will be more readily understood from a consideration of the drawings in which:

FIGURE 4 is an enlarged fragmentary sectional view illustrating the operation of the process generally as well as of a specific embodiment of the invention.

Figure 1:
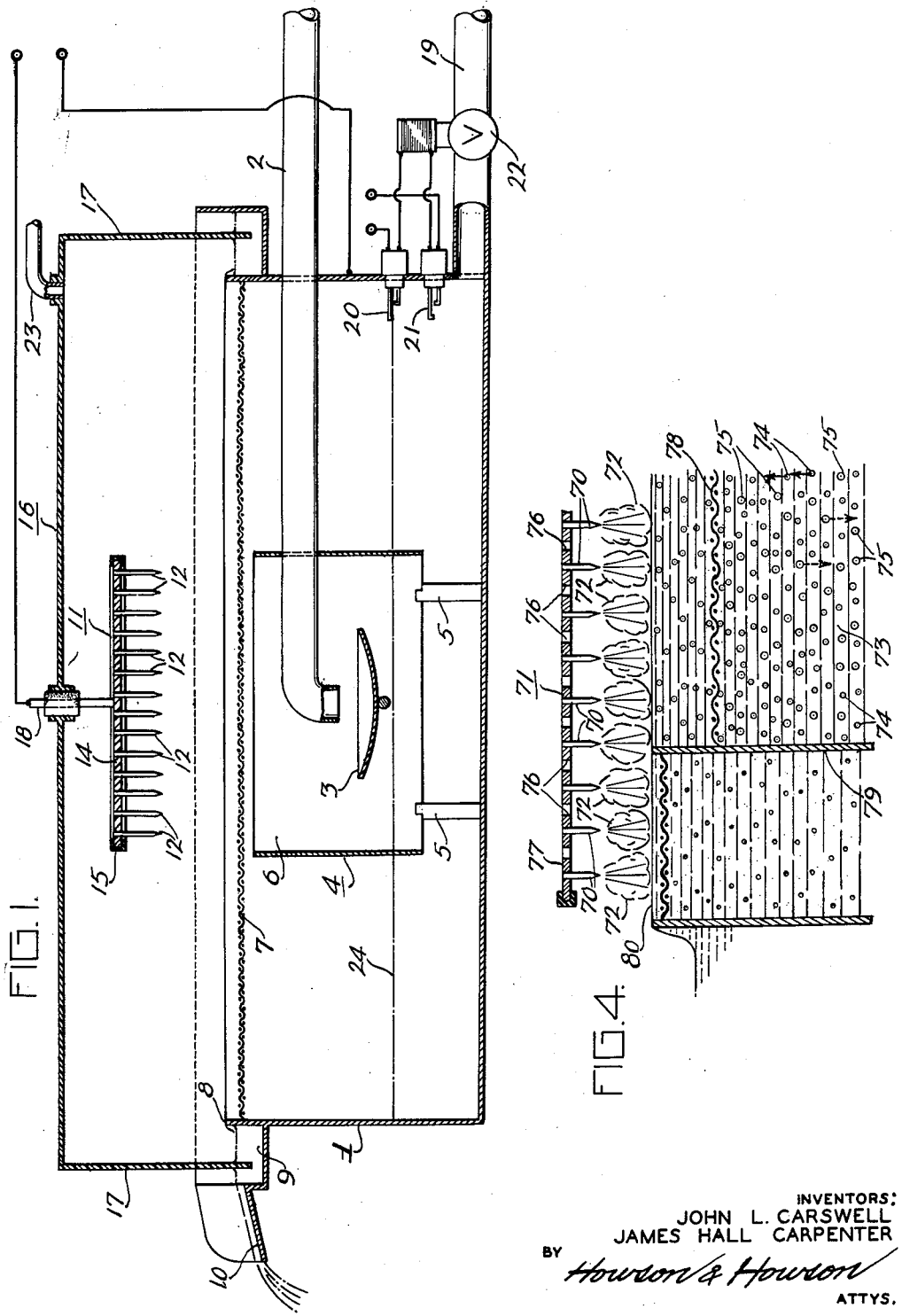
FIGURE 1 is a vertical section through one form of apparatus of the present invention for carrying out the process.

It has been found that an oil-water emulsion can be more thoroughly, rapidly and efficiently separated into its component phases by electrical means if the discharge electrodes are not immersed in the body of oil-water emulsion but are actually spaced above the surface thereof, and if the emulsion is passed upwardly through a screen, as described, during the treatment and, preferably, the oil permitted to remain in a relatively quiescent condition immediately after subjection to the corona wind and before withdrawal from the vessel. It has been found that by generating a corona wind discharge and bombarding the surface of the oil-water emulsion therewith in accordance with the present invention substantially all of the water can be coalesced and agglomerated and caused to settle rapidly out of the body of emulsion without giving rise to the re-emulsification phenomenon and short-circuiting encountered when the discharge electrodes are immersed in the emulsion. Hence, with the present invention there is much less limitation placed on the amount of voltage employed and on the spacing of the discharge electrodes from the oppositely-charged submerged electrode (screen) than is the case when the discharge electrodes are immersed in the emulsion.

Corona wind discharge from an electrode, especially from a pointed electrode, is well known and is sometimes referred to as a silent discharge. It occurs when gas adjacent the point of a discharge electrode connected to a high voltage source becomes charged similarly to that of the discharge electrode. Because the charged gas particles are of the same charge as the electrode, they are repelled away from it thus setting up a current of charged gas referred to as the corona wind. In accordance with the present invention, the corona wind is directed against the surface of the oil-water emulsion whereby the charged gas molecules, upon impinging with the surface of the emulsion, give up their charge to water particles at the surface of the emulsion. The charged water particles thereupon migrate toward the submerged screen which is charged oppositely to that of the discharge electrodes and, upon reaching the screen, lose their charge and coalesce and agglomerate with each other, and with other droplets passing upwardly through the screen in incoming emulsion, into larger drops which readily settle out. Some of the coalesced water drops pass out from under the discharge electrodes in the normal flow of liquid through the system but they are of such a nature as to settle out afterwards in the treating vessel during the relatively quiescent period immediately following subjection to the corona wind as provided by the present invention. Suspended solid particles associated with the water phases also settle out at the same time. The bombardment of the surface of the oil-water emulsion by the corona wind causes agitation of the surface but this agitation is of a type different from that occasioned when the electrode is immersed in the emulsion and does not normally cause re-emulsification.

Insofar as the broader aspects of the invention are concerned, it is immaterial whether the discharge electrodes are charged positively or negatively so long as the screen submerged in the oil-water emulsion is of the opposite charge. Preferably, particularly in the treatment of petroleum oil-water emulsions where the gas atmosphere is largely methane, the discharge electrodes are positively charged. Likewise, while an alternating current may be employed, it is preferred to employ a uni-directional current, such as an alternating current rectified to produce a direct current. Hence, for simplicity herein, the discharge electrodes giving rise to the corona wind discharge may be referred to as the positive electrodes and the submerged screen may be referred to as the negative or grounded electrode.

Referring then to FIGURE 1, reference numeral 1 represents generally a vessel of steel or other suitable material. 2 represents a conduit for admitting oil-water emulsion centrally of vessel 1. A baffle plate 3 is provided to aid in dispersing incoming oil-water emulsion, and an annular baffle 4, supported as by posts 5, is provided to confine the incoming emulsion to a central position 6 for passing upwardly through a screen 7. Vessel 1, which may be cylindrical, rectangular, square or the like in horizontal cross section, is provided at its top with means for withdrawing substantially water-free oil as it flows upwardly and outwardly. The means shown in FIGURE 1 comprise a weir 8 over which the dry oil flows into a collecting basin 9 and thence out a conduit or spout 10. Located above weir 8 and hence above the liquid level in vessel 1 is a discharge electrode assembly 11 comprising pointed electrodes 12. Electrode assembly 11, which is supported from above, is made up of conducting metal plate 14 to which pointed electrodes 12 are attached. Around the periphery of plate 14 is an insulating ring 15 to prevent discharge from the edge of the plate, and this may be of oil-resistant rubber like neoprene. The pointed electrodes 12 are positioned above the liquid level maintained in vessel 1 by weir 8, and the axes thereof are substantially normal to the liquid level so as to discharge corona wind downwardly onto the liquid surface. The plane of the points is substantially parallel to the liquid level. Over discharge electrode assembly 11 is a hood 16, the side walls 17 of which extend below weir 8 and are spaced outwardly from the walls of vessel 1. Hood 16 is preferably of a non-conducting material like synthetic resin, such as methyl methacrylate. This in conjunction with collecting basin 9 and the level of spout 10, forms a gas-liquid seal maintaining the desired gas atmosphere in the space occupied by discharge electrode assembly 11 and between electrodes 12 and the liquid level. Discharge electrode assembly 11 is connected to a source of high voltage (not shown) as through conduit 18.

Positioned slightly below the liquid level provided by weir 8 is screen 7. Screen 7 may be of crossing conducting metal wires or other conducting reticulated, foraminous or grid-like structure such as provided by a perforated conducting metal sheet or plurality of wires or rods, or the like, the important feature being that it presents a large electrode surface relative to volume while permitting liquid freely to pass therethrough. This is particularly important to prevent accumulation of water and other settling materials thereon. Screen 7 need not extend entirely across vessel 1 and it may terminate substantially at the bounds of discharge electrode assembly 11. Screen 7 will, however, be charged oppositely to that of discharge electrode assembly 11 as by being connected electrically to vessel 1 which in turn is, e. g. grounded when discharge electrode assembly 11 is positive.

It is desirable to maintain a preselected level of water layer 24 below the liquid level defined by weir 8, and for this purpose means are provided to control the water take-off valved conduit 19, including electrodes 20 and 21, respectively, the electrode 21 being adapted to close valve 22 when the water level tends to fall below the level of electrode 21 and the electrode 20 being adapted to open valve 22 when the water level tends to rise above electrode 20. It will be apparent that other conventional liquid level control means may be employed.

Should it be desired to operate under a substantially oxygen-free atmosphere, air may be evacuated from within hood 16 through conduit 23 and replaced by the desired gas which may be hydrocarbon gases contained in the incoming emulsion. The presence of the gas atmosphere under hood 16 can be controlled by means (not shown) connected to conduit 23 for maintaining the desired gas-liquid seal.

In separating the phases of an oil-water emulsion in accordance with apparatus of the type shown in FIGURE 1, oil-water emulsion is introduced to vessel 1 through conduit 2, with electrode assembly 11 being connected to a source of high voltage and with screen 7, vessel 1, baffles 3 and 4 and posts 5 (and water layer 24) being charged oppositely. The flow of emulsion is upwardly in central portion 6, through screen 7 toward the downwardly-directed corona wind discharge coming from electrode assembly 11. Loosely held water may separate out within central portion 6 by gravitation. As the emulsion passes upwardly through screen 7 to the surface, water particles are forced to the screen where they coalesce, with each other and with water particles coming up through the screen, into larger drops which gravitate to the bottom of vessel 1. The water separating out of the emulsion forms water layer 24. The oil spends a relatively short time in the treating zone defined by the bounds of electrode assembly 11 after which it flows outwardly from central portion 6 to the larger space between baffle 4 and the walls of vessel 1. This flow is relatively quiescent, that is substantially without turbulence, permitting remaining coalesced water drops to gravitate out of the oil to the bottom of vessel 1 before turbulence, which would cause re-emulsification, is encountered in the oil recovery system. The resulting substantially water-free oil flows over weir 8 into collecting basin 9 and out spout or conduit 10. Water from water layer 24, together with any associated solid particles, is continuously or intermittently, preferably substantially continuously, removed through conduit 19.

Figure 2:
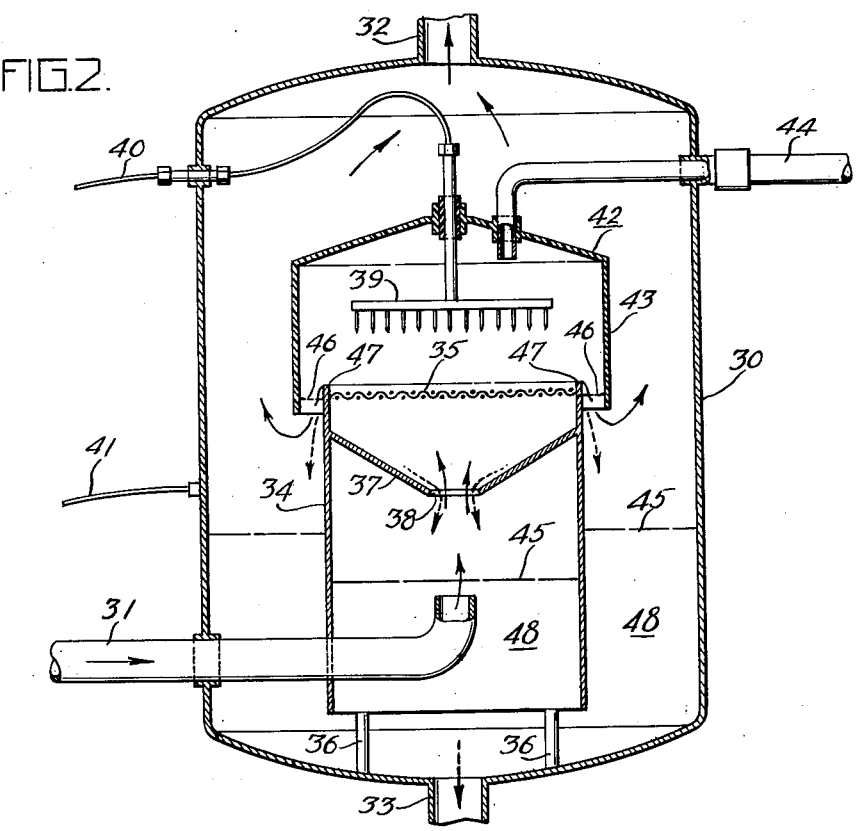
FIGURE 2 is a vertical section through a preferred form of apparatus of the present invention for carrying out the process.

FIGURE 2 represents a preferred form of apparatus providing especially long residence time for the treated oil under relatively quiescent conditions. Reference numeral 30 represents a vessel provided with conduit 31 for admitting oil-water emulsion, conduit 32 for withdrawing substantially water-free oil and conduit 33 for withdrawing water. As in the case of FIGURE 1, vessel 30 may be cylindrical, rectangular, square or the like in horizontal cross section. Within vessel 30 is annular baffle 34, supported as by posts 36, near the top of which is screen 35 which may be as defined in connection with FIGURE 1. Within baffle 34 may be further baffle means 37 provided with central opening 38 to direct the upward flow of emulsion centrally within baffle 34. Discharge electrode assembly 39, which may be as described in connection with FIGURE 1, is connected through insulated conduit 40 to a source of high voltage (not shown). Vessel 30, baffles 34 and 37 (through posts 36) and screen 35 are adapted to be charged oppositely to that of discharge electrode assembly 39, as by being grounded through conduit 41 when discharge electrode assembly 39 is positive. Over discharge electrode assembly 39 is provided hood 42 the side walls 43 of which extend below the top of baffle 34 and are spaced outwardly therefrom. Hood 42 is preferably of non-conducting material. The gas pressure within hood 42 may be controlled through conduit 44 by conventional means not shown. The level 45 of water layer 48 will also be controlled, as is the case of FIGURE 1, by means not shown.

In separating the phases of an oil-water emulsion in apparatus of the type shown in FIGURE 2 the entire vessel 30, except for the space defined by hood 42, the liquid level at the top of baffle 34 and gas-liquid seal 46, is filled with liquid. Emulsion is admitted through conduit 31 centrally of baffle 34 and flows upwardly through central aperture 38 (as shown by the solid arrows) and through screen 35 toward the downwardly directed corona wind discharge coming from discharge electrode assembly 39. Loosely held water may begin to separate within the space defined by baffle 34 and below screen 35 being aided by coalesced water drops falling from screen 35 to water layer 48 (as shown by the dotted arrows). Water particles above the screen 35 are forced to the screen where they coalesce into larger drops which gravitate to water layer 48. The oil continues its flow to and over the weir 47 provided by the top of baffle 34. Water drops remaining in the oil passing over weir 47 and through gas-liquid seal 46 have ample time, during the flow to oil outlet conduit 32 to gravitate away from the oil (as shown by the dotted arrows below gas-liquid seal 46) before the substantially water-free oil is removed through conduit 32 and subjected to turbulence in the oil recovery system. The flow from gas-liquid seal 46 to conduit 32 is substantially free from turbulence, that is, substantially quiescent, so that there is no danger of re-emulsification before the remaining water has had an opportunity to settle out. During the process the gas pressure within hood 42 is controlled through conduit 44 to provide the gas-liquid seal 46.

Figure 3:
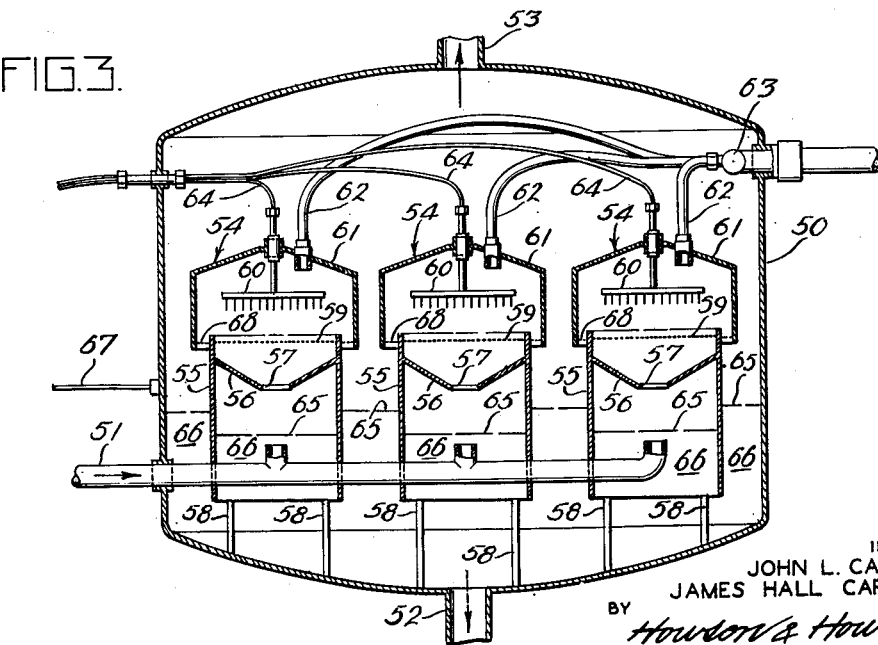
FIGURE 3 is a vertical section of another preferred form of apparatus of the present invention.

FIGURE 3 illustrates a particularly preferred form of the present invention adapted to handle large amounts of material in an efficient manner. This figure shows a plurality of individual treating units in a common plane within a single vessel 50. Although the drawing shows three units within vessel 50 for the purposes of illustration, it is understood that any convenient number may be employed. A plurality of individual units as described provides better results than one large unit providing the same area of discharge electrode assembly, for one of the important features is the relatively short duration of treatment under the corona wind followed by the relatively long substantially quiescent period before the oil is subjected to turbulence. This can be accomplished for each volume of emulsion admitted to a large vessel through the employment of a plurality of units therein whereas this can not be accomplished with one large unit where the duration of treatment under the corona wind for all liquid treated would be unduly extended. In addition a plurality of units provides a greater length of weir than one large unit, and the longer the weir length the slower (and hence more quiescent) the flow of oil thereover for a given volume of emulsion admitted to the vessel.

According to FIGURE 3 emulsion is admitted to vessel 50 through conduit 51, water is removed through conduit 52 and substantially water-free oil is removed through conduit 53. The individual units 54 may be as described in connection with FIGURE 2, being provided with baffles 55, supported as by posts 58, inner baffles 56 provided with central apertures 57, screens 59, discharge electrode assemblies 60, hoods 61, conduits 62 connecting hoods 61 with gas pressure control means (not shown) through manifold 63 and electrical conduits 64 connecting discharge electrode assemblies 60 to a source of high voltage (not shown). Vessel 50, baffles 55, 56, posts 58 and screens 59 will be adapted to be charged oppositely to that of discharge electrode assemblies 60 as through conduit 67.

Flow of liquids in operation of the process in apparatus of the type illustrated in FIGURE 3 is the same as described in connection with FIGURE 2 with emulsion being admitted from conduit 51 centrally of the baffle 55 of each unit and flowing upwardly in each unit through central aperture 57 and screen 59 toward the respective corona wind discharges. Separated water gravitates to water layer 65, from which it is removed in a controlled manner to maintain the desired level 65 through conduit 52, and substantially water-free oil is removed through conduit 53 after at least substantially all of the last portion of retained water has had an opportunity to settle out during the relatively quiescent flow from gas-liquid seal 68 to conduit 53.

FIGURE 3 illustrates the use of a plurality of individual units on the same level operated in parallel. It is understood that a plurality of units may also be used in series where a first unit (or units) is used primarily for roughing treatment, that is separating the main portion of water, and the succeeding unit (or units) is used for a final or finishing treatment to separate the remaining water. Combinations of parallel and series operation in which a plurality of levels is employed in series, there being a plurality of units in each level operated in parallel.

Referring to FIGURE 4, this serves to show figuratively the operation of the discharge electrodes 70 of discharge electrode assembly 71 wherein corona wind discharges 72 are directed downwardly onto the surface of emulsion 73. Reference numeral 74 represents, somewhat enlarged, water particles in the upwardly flowing emulsion which coalesce into larger drops 75 that gravitate to the bottom of the treating vessel. FIGURE 4 also shows a feature which may be embodied in any of FIGURES 1–3 namely, perforations 76 through the plate 77 of electrode assembly 71 which serve to aid circulation of gas in the atmosphere under the hood (not shown). In addition FIGURE 4 shows a feature which may be employed in place of provision for long relatively quiescent residence time or in conjunction with such provision as shown in FIGURES 1–3 to hasten the separation of water remaining in the oil after passage through screen 78 and over baffle 79, namely, an additional screen 80 placed closer to the discharge electrodes 70 than screen 78. Screen 80 will be finer than screen 78, that is, screen 80 will possess a larger number of openings per unit area than screen 78, in order to diffuse the more intense electrical action at its site. In accordance with this embodiment discharge electrode assembly 71 extends also over at least a substantial portion of screen 80 and screen 80 being closer to discharge electrodes 70 the action of the corona wind discharge on the water remaining is more severe accelerating its coalescence and gravitation.

The oil-water emulsion treated in accordance with the present invention may be any emulsion of oil and water in which the oil phase has a lower specific gravity than the water phase, and in which the water phase is dispersed in the oil phase, i.e., a water-in-oil emulsion. The nature of the oil may vary widely and the oil may be petroleum (mineral), vegetable or animal in origin. The present invention is particularly applicable for the treatment of petroleum emulsions. The proportion of emulsified water in the emulsion treated in accordance with the present invention may vary widely. In some cases, the emulsified water content may reach as high as about 50%. In other cases, the water content may be as low as about 1%, and even this can be removed in accordance with the present invention. It has been found that solid, water-wettable impurities in the emulsion become associated with and entraped in the water phase and are removed with the water phase.

The electrical potential on the discharge electrodes generating the corona wind may vary widely from as low as about 10,000 volts up to about 100,000 volts. As stated, one of the primary advantages of the present invention is its ability to employ high voltages, and, hence, preferably voltages of at least about 30,000 volts will be employed.

An important feature of the present invention is the spacing of the discharge electrodes from the surface of the material being treated. The exact distance between the surface of the material being treated and the discharge electrodes (the points in the case of pointed discharge electrodes) is subject to some variation depending upon the electrical conductivity of the oil, the voltage employed and the density of the gaseous atmosphere, the distance between the surface of the oil-water emulsion and the discharge electrodes varying directly with the amount of voltage, the conductivity of the oil and the density of the gaseous atmosphere. Generally, for substantially complete dehydration the distance may range from about ¼ inch to about 3 to 4 inches, with empirical adjustment within this range for the variables mentioned above.

The efficiency of water separation is also directly proportional to the depth of the layer of material above the submerged screen. Hence, when the water content is relatively high, the depth of oil-water emulsion above the submerged screen may range up to several inches and at lower water contents the depth of material above the submerged screen should likewise be decreased to facilitate efficient separation of water. The embodiment of FIGURE 4 can be here utilized to allow for decreasing water content during operation of the process. Thus, as the flow of oil-water emulsion proceeds to the bounds of the electrical field (toward the left in FIGURE 4) the depth of the liquid above a screen is reduced, in steps as illustrated in FIGURE 4, to provide the ultimate desired degree of dehydration. Variations in depths of liquid above the screen to accommodate decreasing water contents can also be accomplished by employing a plurality of units in series wherein the depth of liquid above the screen in a succeeding unit or units is less than in a proceeding unit or units. The depth of liquid above the screen is dictated not only by the conductivity of the oil but also by the intensity of the corona wind discharge as determined by the voltage employed and by the spacing of the pointed discharge electrodes with respect to each other. The depth of liquid above the screen can best be determined empirically for any given set of circumstances and requirements. In general the depth will be at least about one-sixteenth of an inch and may range up to about an inch.

The number of pointed discharge electrodes per unit of area, along with the voltage employed, determines the intensity of the corona wind discharge. The pointed electrodes may be as closely spaced as about one-quarter inch on center. The exact spacing between the electrodes may be determined by the variable factors mentioned above, i.e., voltage, distance between the pointed electrodes and the surface of the material being treated, conductivity of the oil and nature of the gaseous atmosphere. The pointed electrodes may be as far apart as about 3 to 4 inches on center or greater. Pointed discharge electrodes will be in the form of needles, spikes, and the like, and are preferably made of high temperature resistant metal, like tungsten or stainless steel, although any conducting metal may be employed particularly where a non-oxygen-containing atmosphere is used.

Reference has been made above to operating under an atmosphere of substantially oxygen-free gas. This is recommended when working with emulsions containing combustible gases, such as combustible hydrocarbon gases in petroleum emulsions, to avoid explosions. In this connection, a petroleum emulsion containing volatile hydrocarbon gases may provide its own oxygen-free atmosphere by permitting the gases escaping from the emulsion to displace the air. The use of pressure somewhat above atmospheric, such as from about 0.1 to about 20–30 p.s.i. (gauge) in treating petroleum emulsions containing the usual dissolved gaseous hydrocarbons, prevents undue loss of those gases from the oil through volatilization, and are necessary to provide the desired gas-liquid seal in apparatus of the type shown in FIGURES 1 and 2. Otherwise, pressures at or below atmospheric may be employed.

Illustrating the results obtained with the apparatus of the present invention, tests were run in a treater of the type shown in FIGURE 3 having seven individual units in a common plane within a vessel having a volume of approximately 5½ bbls. The voltage applied at the discharge electrodes was 30,000 volts and the current was 0.5–0.75 milliampere. Crude petroleum emulsions from the Cache Creek Field, Oklahoma, having water contents up to 15% (free and emulsified) and at temperatures of 60°–70° F., were treated at the rate of about 35 bbls. per hour. The oil leaving the treater had water contents of 0.1–0.3%, and this water substantially entirely settled out upon standing a few hours in a storage tank.

Although the invention has been described particularly with respect to the treatment of oil-water emulsion, it is contemplated that the apparatus, at least certain embodiments thereof, may be applicable for the treatment of other liquids with a corona wind discharge.

We claim:

1. The method of separating the phases of a water-in-oil emulsion which comprises maintaining a relatively deep body of oil and water, directing a stream of water-in-oil emulsion upwardly from within said body to the surface of said body, subjecting the emulsion at the surface of said body to a plurality of spaced corona wind discharges, subjecting at least a portion of said surface to an underlying charge, opposite to that of said corona wind discharges, whereby the water particles of the water-in-oil emulsion are contacted by said corona wind discharges to assume a charge and are drawn toward said underlying charge to coalesce, settle further and separate from the oil phase of the emulsion, slowly flowing the treated oil in said liquid body while maintaining the treated oil in a relatively quiescent state to permit the water to settle therefrom, withdrawing the treated oil from the upper portion of said liquid body, and withdrawing water from the lower portion of said liquid body.

2. The method of separating the phases of a water-in-oil emulsion which comprises maintaining a relatively deep body of said emulsion, directing a stream of emulsion upwardly from within said body to the surface of said body, subjecting the surface of said body to a plurality of spaced laterally fixed, downwardly directed corona wind discharges, subjecting at least a portion of said surface to an underlying charge, opposite to that of said corona wind discharges, located substantially above the bottom of said body, and withdrawing the treated emulsion from the upper portion of said body.

3. The method of claim 2 wherein said corona wind discharges are in a substantially oxygen-free atmosphere.

4. The method of claim 2 wherein the electrical potential is from about 10,000 volts to about 100,000 volts.

5. The method of separating the phases of a water-in-oil emulsion which comprises subjecting the surface of said emulsion in the upper portion of a body of oil and water to a plurality of laterally fixed, downwardly-directed corona wind discharges while there is a zone, in said body of oil and water, underlying the surface thereof and substantially above the bottom thereof, of a charge opposite to that of said corona wind discharges, water particles of the water-in-oil emulsion contacted by said corona wind discharges assuming a charge and settling to said underlying zone there to coalesce and settle further in said body toward the lower portion thereof away from the oil phase, and below said underlying zone withdrawing the treated oil from the upper portion of said body, and withdrawing water from the lower portion of said body.

6. The method of separating the phases of a water-in-oil emulsion which comprises subjecting the surface of said emulsion in the upper portion of a body of oil and water to a plurality of spaced, laterally-fixed, downwardly-directed corona wind discharges while there is a zone in said body of oil and water across at least a substantial portion thereof, underlying the surface thereof and substantially above the bottom thereof, of a charge opposite to that of said corona wind discharges, water particles of the water-in-oil emulsion contacted by said corona wind discharges assuming a charge and settling to said underlying zone there to coalesce and settle further in said body toward the lower portion thereof away from the oil phase, and below said underlying zone withdrawing the treated oil from the upper portion of said body, and withdrawing water from the lower portion of said body.

7. Apparatus for treating liquids with a corona wind discharge which comprises an enclosed vessel and means defining an upper liquid level including at least one annular baffle within said vessel; means for admitting liquid to within the annular baffle below the top thereof; liquid-permeable electrode means positioned within the upper portion of said baffle and above said means for admitting liquid and extending at least a substantial distance across said baffle; a multiplicity of laterally fixed, discharge electrodes spaced above the top of said baffle and adapted, upon being connected to a high voltage source, to effect downwardly-directed corona wind discharges to the level defined by the top of said baffle, said liquid permeable electrode means being adapted to be charged oppositely to that of said discharge electrodes; and means for recovering liquid from the top of said baffle.

8. Apparatus for treating liquids with a corona wind discharge which comprises an enclosed vessel and means defining an upper liquid level including at least one annular baffle within said vessel; means for admitting liquid to within the baffle below the top thereof; liquid-permeable electrode means positioned in the upper portion of said baffle and above said means for admitting liquid and extending at least a substantial distance across said baffle; a multiplicity of space, laterally-fixed, downwardly-pointed discharge electrodes spaced above the top of said baffle and adapted, upon being connected to a high voltage source, to effect downwardly-directed corona wind discharges to the level defined by the top of said baffle, said liquid-permeable electrode means being adapted to be charged oppositely to that of said discharge electrodes; a hood extending over said discharge electrodes with sides extending down below the top of said baffle but spaced outwardly therefrom; and means for recovering liquid from the top of said baffle.

9. Apparatus for treating liquids with a corona wind discharge which comprises an enclosed vessel and, within said vessel, at least one annular baffle the bottom of which is in flow-communication with the lower portion of said vessel; means for admitting liquid to within the baffle below the top thereof; a screen electrode positioned in the upper portion of said baffle and above said means for admitting liquid and extending at least a substantial distance across said baffle; a multiplicity of spaced, downwardly directed pointed discharge electrodes spaced above the top of said baffle and adapted, upon being connected to a high voltage source, to effect downwardly-directed corona wind discharges to the level defined by the top of said baffle, said screen electrode being adapted to be charged oppositely to that of said discharge electrodes; a hood extending over said discharge electrodes with sides extending down below the top of said baffle but spaced outwardly therefrom; gas pressure regulating means connected to said hood; and means for removing liquid from the upper part of said vessel.

10. The apparatus of claim 9 comprising also means for removing liquid from the bottom of said vessel.

11. Apparatus for treating liquids with a corona wind discharge which comprises a chamber for holding liquid; means for admitting liquid to said chamber below the top thereof; weir means in the walls of said chamber above said means for admitting liquid and effective to establish the upper level of liquid admitted to said chamber for treatment; a multiplicity of spaced laterally fixed, downwardly-directed pointed electrodes spaced above said weir means and adapted, upon being connected to a high voltage source, to effect downwardly-directed corona wind discharges to the level defined by said weir means; liquid-permeable electrode means extending at least a substantial distance across said chamber above said means for admitting liquid but below said weir means and adapted to be charged oppositely to that of said discharge electrodes; and means for recovering liquid from said weir means.

12. The method of separating the phases of a water-in-oil emulsion which comprises directing a stream of water-in-oil emulsion upwardly from within a body of oil and water to the surface of said body, subjecting the emulsion at the surface of said body to a plurality of spaced, laterally fixed, downwardly-directed corona wind discharges, said emulsion in its upward flow being passed through a zone underlying the surface of the body of a charge opposite to that of said corona wind discharges, whereby water particles of the water-in-oil emulsion are contacted by said corona wind discharges to assume a charge and settle to said underlying zone to there coalesce and settle further in said body toward the lower portion thereof away from the oil phase of said emulsion, withdrawing the treated oil from the upper portion of said body, and withdrawing water from the lower portion of said body.

13. The method of separating the phases of a water-in-oil emulsion which comprises directing a stream of water-in-oil emulsion upwardly from within a relatively deep body of oil and water to the surface of said body, subjecting the emulsion at the surface of said body to a plurality of spaced, laterally fixed, downwardly-directed corona wind discharges whereby water particles in said emulsion assume a charge, said emulsion in its upward flow being passed through a zone, underlying said surface, of a charge opposite to that of said corona wind discharges, the charged water particles settling back to said underlying one where they coalesce and from where they settle to the lower portion of said body, slowly flowing the treated oil at said surface laterally away from said corona wind discharges while maintaining the treated oil in a relatively quiescent state and withdrawing said treated oil from the upper portion of said liquid body, and withdrawing water from the lower portion of said liquid body.

References Cited in the file of this patent

UNITED STATES PATENTS

| 1,578,624 | Anderson | Mar. 30, 1926 |
| 1,838,847 | Lawrason | Dec. 29, 1931 |
| 1,838,929 | Fisher | Dec. 29, 1931 |
| 2,033,137 | Fisher | Mar. 10, 1936 |
| 2,033,418 | Eddy | Mar. 10, 1936 |
| 2,209,798 | Subkow | July 30, 1940 |
| 2,884,375 | Seelig et al. | Apr. 28, 1959 |

FOREIGN PATENTS

| 462,255 | Canada | Jan. 3, 1950 |